US009154927B2

(12) United States Patent
Kearney

(10) Patent No.: US 9,154,927 B2
(45) Date of Patent: Oct. 6, 2015

(54) MMS TEXT MESSAGING FOR HAND HELD INDICIA READER

(71) Applicant: METROLOGIC INSTRUMENTS, INC., Blackwood, NJ (US)

(72) Inventor: Sean Philip Kearney, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 14/159,509

(22) Filed: Jan. 21, 2014

(65) Prior Publication Data

US 2014/0131438 A1    May 15, 2014

Related U.S. Application Data

(63) Continuation of application No. 13/023,085, filed on Feb. 8, 2011, now Pat. No. 8,636,200.

(51) Int. Cl.
*G06K 15/00* (2006.01)
*H04W 4/14* (2009.01)
*G06Q 30/02* (2012.01)
*G06Q 30/06* (2012.01)
*G06K 7/01* (2006.01)

(52) U.S. Cl.
CPC . *H04W 4/14* (2013.01); *G06K 7/01* (2013.01); *G06Q 30/02* (2013.01); *G06Q 30/06* (2013.01)

(58) Field of Classification Search
CPC ......... G06K 7/01; G06Q 30/02; G06Q 30/06; H04W 4/14
USPC ................ 235/383, 385, 375, 472.01–472.03
See application file for complete search history.

(56) References Cited

U.S. PATENT DOCUMENTS

| 6,036,086 | A | 3/2000 | Sizer, II et al. |
|---|---|---|---|
| 7,275,689 | B2 | 10/2007 | Mak |
| 7,364,070 | B2 | 4/2008 | Chang |
| 7,386,471 | B1 | 6/2008 | Nack |
| 7,472,825 | B2 | 1/2009 | Fitch et al. |
| 8,636,200 | B2 | 1/2014 | Kearney |
| 2002/0143643 | A1 | 10/2002 | Catan |
| 2003/0132294 | A1 | 7/2003 | Gomez et al. |

(Continued)

FOREIGN PATENT DOCUMENTS

| CN | 102750507 A | 10/2012 |
|---|---|---|
| EP | 2485185 A1 | 8/2012 |

(Continued)

OTHER PUBLICATIONS

European Patent Office Search Report for EP Application No. 121541280 (Pub. No. EP2485185A1), mailed Jul. 2, 2012 (3 pages).

*Primary Examiner* — Seung Lee
(74) *Attorney, Agent, or Firm* — Additon, Higgins & Pendleton, P.A.

(57) ABSTRACT

A method of operating a reader system includes: establishment a hand held reader configured to read an information bearing medium at an establishment and accepting text message communications from the establishment; reading the information bearing medium at the establishment with the reader; and, sending at least one text message communication to an operator of the reader at the establishment on the reader GUI from the establishment when the establishment recognizes a need for a specific notice requirement after reading the information bearing medium.

20 Claims, 3 Drawing Sheets

(56) References Cited

U.S. PATENT DOCUMENTS

| | | |
|---|---|---|
| 2007/0299728 A1 | 12/2007 | Nemirofsky et al. |
| 2008/0114699 A1 | 5/2008 | Yuan et al. |
| 2008/0222048 A1 | 9/2008 | Higgins et al. |
| 2008/0262928 A1 | 10/2008 | Michaelis |
| 2010/0019025 A1 | 1/2010 | Wang et al. |
| 2010/0099391 A1 | 4/2010 | Warakagoda et al. |
| 2010/0223145 A1 | 9/2010 | Dragt |
| 2011/0029920 A1 | 2/2011 | Kang |
| 2011/0161230 A1* | 6/2011 | Singh .............................. 705/44 |
| 2012/0041845 A1 | 2/2012 | Rothschild |
| 2014/0131438 A1 | 5/2014 | Kearney |

FOREIGN PATENT DOCUMENTS

| | | |
|---|---|---|
| JP | 2012164315 A | 8/2012 |
| WO | 2005101337 A1 | 10/2005 |

* cited by examiner

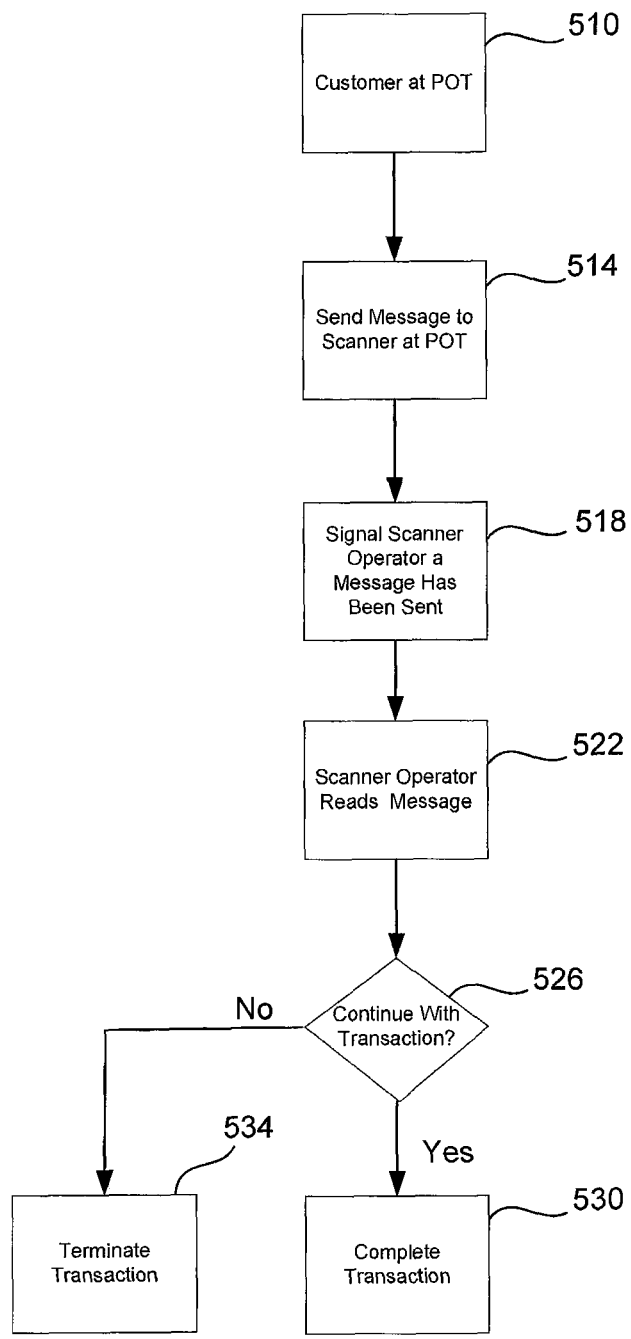

MMS TEXT MESSAGING FOR HAND HELD INDICIA READER

CROSS-REFERENCE TO RELATED APPLICATION

The present application claims the benefit of U.S. patent application Ser. No. 13/023,085 for MMS Text Messaging for Hand Held Indicia Reader filed Feb. 8, 2011 (and published Aug. 9, 2012 as U.S. Patent Publication No. 2012/0199644), now U.S. Pat. No. 8,636,200. Each of the foregoing patent application, patent publication, and patent is hereby incorporated by reference in its entirety.

FIELD OF THE INVENTION

The present invention relates to indicia reading devices, and more particularly to a method of operating an indicia reader.

BACKGROUND

Indicia reading devices (also referred to as scanners, laser scanners, image readers, indicia readers, etc.) typically read data represented by printed or displayed information bearing indicia (IBI), (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible or infrared light. Laser indicia reading devices typically utilize transmitted laser light.

One-dimensional (1D) indicia readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an indicia reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or transceiver for communicating with a remote computer.

Efforts regarding such systems have led to continuing developments to improve their versatility, practicality and efficiency.

BRIEF DESCRIPTION OF THE DRAWINGS

FIG. 3 is an exemplary flow chart for operating an indicia reader.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia (or symbol). The term imaging used herein refers to the taking or creation of an electronic image.

Exemplary methods may be conceived to be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs." "objects." "functions." "subroutines," "libraries," ".dlls." "APIs." and "procedures." While one or more of these terms may find favor in the present description, there is no intention to limit the invention to the described configurations.

In general, the sequences of steps in the present methods require physical manipulation of physical quantities. These quantities take the form of optical, electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

With respect to the software described herein, those of ordinary skill in the art will recognize that there exist a variety of platforms and languages for creating software for performing the methods outlined herein. Those of ordinary skill in the art also recognize that the choice of the exact platform and language may be often dictated by the specifics of the actual system constructed, such that what may work for one type of system may not be efficient on another system. It should also be understood that the methods described herein are not limited to being executed as software on a computer or DSP (Digital Signal Processor), but may also be implemented in a hardware processor. For example, the methods may be implemented with HDL (Hardware Design Language) in an ASIC.

Figure 1:
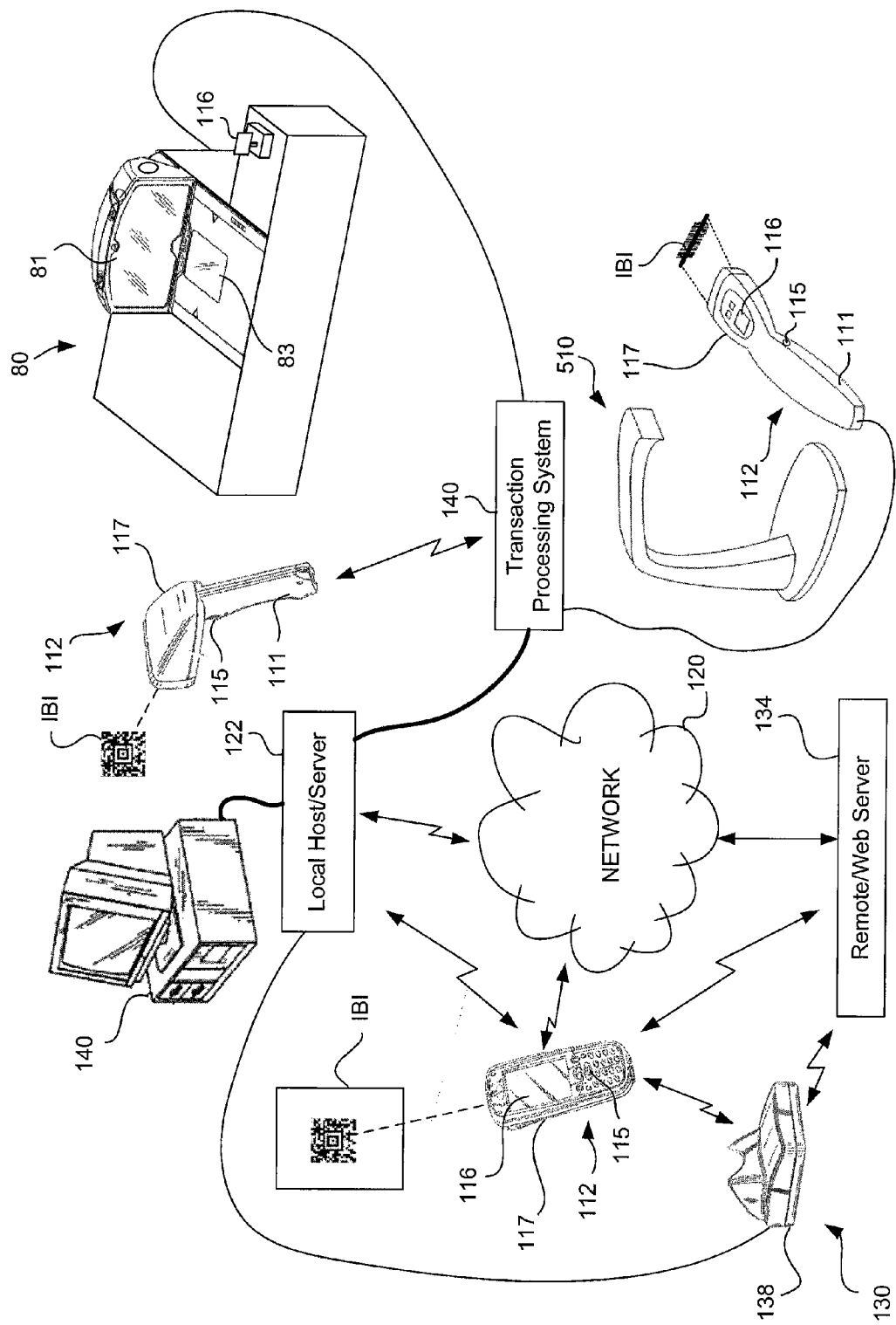
FIG. 1 is a block diagram of an exemplary indicia reader system.

FIG. 1 illustrates an exemplary scanning system, wherein a plurality of indicia readers 112 operated and utilized where information bearing indicia (IBI) are present. The indicia readers may be stationary or hand-held and may be either laser indicia reading devices (or laser scanners) utilizing transmitted laser light or optical indicia reading devices utilizing image capturing devices for extracting data from IBIs.

An exemplary embodiment of a laser scanning system includes a centrally-positioned double-sided rotating mirror or central spinner, a first and second deflector or directional mirror, a first and second wobbling mirror, and a plurality of pattern mirrors. A scanning system and the foregoing components may be mounted in stationary or fixed housings 80, wherein patterns mirrors may be positioned and aligned to direct the two scanning patterns in different directions towards a common scanning field. Exemplary stationary or fixed-mount retail scanners may combine both vertical and horizontal laser output windows 81, 83 respectively that view a single common scanning field or region for reading barcode targets on products that may be located on the bottom or sides of the products.

An operator may aim a hand-held indicia reader 112 at a target containing an IBI, dataform, text, or other data to be collected and actuate a button or trigger 115 on the indicia reader to control full or partial operation of the reader, such as to activate scanning of an IBI. An IBI or dataform may be an originally machine generated symbology that may be also machine readable, such as a 1-D barcode, a 2-D barcode, a 1-D stacked barcode, a logo, glyphs, color-codes, and the like.

An exemplary indicia reader 112 may be a mobile device, such as a hand held scanner, a portable data terminal (PDT), personal digital assistant (PDA), mobile device, etc. A Portable Data Terminal, or PDT, may be typically an electronic device that may be used to enter or retrieve data via wireless transmission (WLAN or WWAN) and may also serve as an indicia reader used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet. An exemplary indicia reader may have a graphic user interface (GUI) such as touch screen display 116. An exemplary indicia reader 112 may have a number of subsystems provided within a housing 117 configured to be hand held. For example, the reader may have a handle portion 111.

Exemplary indicia readers may be in communication (wired or wireless) to a local transaction processing system 140, such as a cash register, customer station or employee station or local host/server 122 directly or through a charging station or base 138. An exemplary local server 122 or indicia reader 112 may be in communication with network 120 and or a remote/web server 134.

Figure 2:
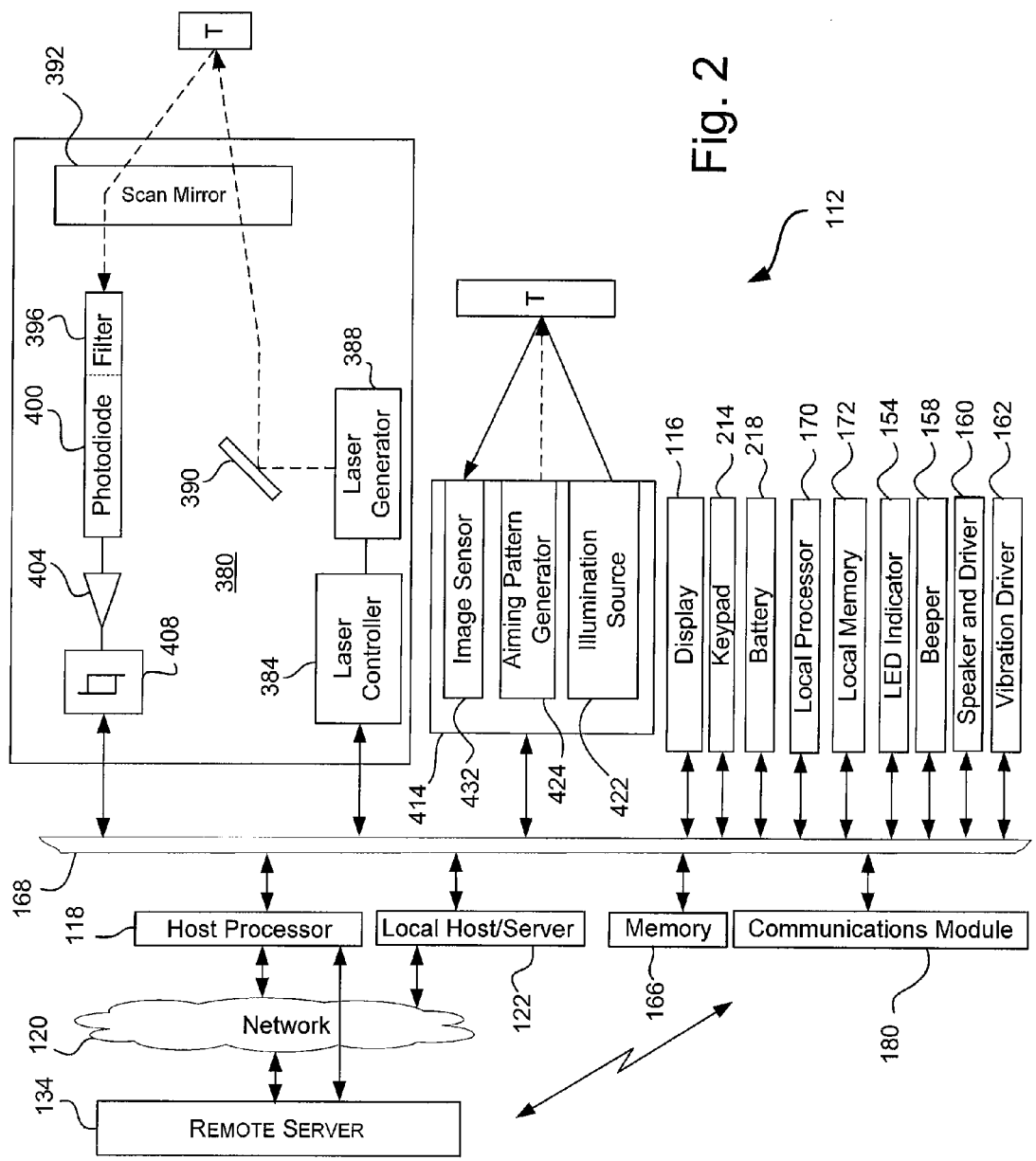
FIG. 2 is a simplified schematic block diagram of an exemplary indicia reader.

Referring to FIG. 2, an exemplary indicia reader 112 may comprise a number of exemplary subsystems, such as laser scan engine 380 or laser scanning reader system for reading indicia on a target T. The laser scanning reader system may comprise a laser controller 384 for controlling a laser generator 388 for generating a laser light beam which may be directed onto a folding mirror 390 which then directs the laser light beam to an oscillating or rotating scan mirror 392 to project a scanning pattern onto target T. The laser scanning pattern may be reflected off of the target and redirected by scan mirror 392 into a receive path comprising a laser light pass filter 396, a photodiode 400, an amplifier 404 and a digitizer 408.

Laser light may be described as a spatially coherent, narrow low-divergence beam of light.

Digitizer 408 may convert an analog signal output by the photodiode into a digital signal representative of the light reflected off of the targets.

Exemplary laser scanners use a laser beam as the light source and employ either a reciprocating mirror or a rotating prism to scan the laser beam back and forth across the IBI. One or more photodiodes are used to measure the intensity of the light reflected back from the bar code. The light emitted by the reader may be rapidly varied in brightness with a data pattern and the photodiode receive circuit may be designed to detect only signals with the same modulated pattern.

An exemplary photodetector or photosensor may be comprised of one or more photodiodes that converts incident light energy into electric charge that may be an output signal representative of light reflected off an IBI. The output of the photodetector may be processed utilizing one or more functions or algorithms to condition the signal appropriately for use in further processing downstream, including decoding of IBIs.

An exemplary indicia reader 112 may comprise one or more optical image engines (image indicia reader systems or optical scan engines) 610 for reading indicia on a target T. Optical image engines capture and read images to detect and decode IBIs located within the captured images. The optical image indicia reader systems may comprise one or more illumination source(s) 618 for illuminating an IBI with a beam or pattern of incoherent light in the form of an illumination pattern and an image sensor 626 for converting light reflected off a target T having an IBI provided thereon into representative output signals thereof. The output signal of the image sensor may be processed utilizing one or more functions or algorithms to condition the signal appropriately for use in further processing downstream, including decoding of IBIs.

An exemplary image sensor converts light or other electromagnetic energy reflected off of a target and provides an output signal representative thereof. Image sensors may be an array of pixels adapted to operate in a global shutter or full frame shutter, mode or alternately operate in a rolling shutter mode. It may be a color, monochrome or monocolor 2D solid state image sensor implemented in any of CCD, CMOS, NMOS, PMOS, CID, CMD, back-illuminated technologies. The reader may be able to operate in either a progressive scan or interleaved scan mode. The image sensor may contain an array of light sensitive photodiodes (or pixels) that convert incident light energy into electric charge. Many solid state image sensors also allow regions of a full frame of image data to be addressed.

Other exemplary reader subsystems or components supported by the housing may include one or more local or on board processor(s) 170, local memory 172, a battery 218, a display 116, a key pad 214 and a wireless communications module 180. The subsystems may communicate via one or more bus 168, data lines or other signal or data communication form. The indicia reader may communicate with one or more host processor(s) 118, a local host/server 122, local memory 166, network 120 or remote server host/server 134.

Communications module 180 may provide a communication link from imaging reader 112 to other indicia readers or to other systems such as a server/remote processor 134.

The processor(s) may be located on board or within the housing with other subsystems. The particulars of the functionality of the processor(s) and the reader may be determined by or based upon certain configuration settings or data which may be stored in firmware, remote or local memory. Configuration settings may be arranged as stored parameter tables.

An exemplary processor may be a mixed-signal array with on-chip controller devices designed to replace multiple traditional MCU-based system components with one single-chip programmable device. It may include configurable blocks of analog and digital logic, as well as programmable interconnects.

The subsystems in the reader may be connected by one or more bus 168, data lines or other signal or data communication form. Exemplary forms may be an Inter-IC bus such as a two wire interface (TWI), dedicated data bus, RS232 interface, USB, etc.

The processor(s) may include a predetermined amount of memory for storing firmware and data. The firmware may be a software program or set of instructions embedded in or programmed on the processor(s) which provides the necessary instructions for how the processor(s) operate and communicate with other hardware. The firmware may be stored in the flash memory (ROM) of the processor(s) as a binary image file and may be erased and rewritten. The firmware may be considered "semi-permanent" since it remains the same unless it may be updated. This firmware update or load may be handled by a device driver.

The processor(s) may be utilized to perform a number of functional operations, which may involve the performance of a number of related steps, the particulars of which may be determined by or based upon certain configuration settings stored in firmware or memory which may be any one of a number of memory types such as RAM, ROM, EEPROM, etc. In addition some memory functions may be stored in memory provided as part of the processor(s).

Exemplary functions of the processor(s) may be controlling operation the scan engine, decoding functions and operator interface functions. Operating software may be utilized to operate the processor(s) for such functions seemingly simultaneously or in a multitasking role. An exemplary image reader operating software architecture may be organized into processes or threads of execution.

Processor(s), memory and associated circuitry which perform or control the exemplary scan and decoding functions may be provided in the scan engine or on associated circuit boards which are located within the housing of the reader. Decoding may be a term used to describe the interpretation of a machine readable code contained in the photodetector output signal.

An exemplary function of the processor(s) may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies.

Operation of the decoding, which may be executed in a user or factory selectable relationship to a scanning routine, may be governed by parameters or configuration settings. Combinations of scanning and decoding parameters together define scanning-decoding relationships or modes which the reader will use. Two exemplary modes may be continuous or discontinuous. In the continuous mode (also referred to as continuous scanning mode, continuous streaming mode, streaming mode, fly-by scanning mode, on the fly scanning mode or presentation mode) the reader may be held in a stationary manner and targets (such as symbols located on packages) are passed by the reader. In the continuous mode, the reader takes continuous scans one after another (seriatim) and continuously decodes or attempts to decode some or all scanned targets. Discontinuous mode may be a mode wherein scanning and/or decoding stops or may be interrupted and initiated with an actuation event, such as pulling of a single pull trigger 115, a timeout, or a successful read to restart. An exemplary utilization of the reader in discontinuous mode may be via hand held operation. Decoding stops once the indicia reader may be no longer triggered. The discontinuous mode may be typically initiated because the operator knows a symbol may be present.

Exemplary indicia readers may use memory or firmware to store certain reader settings or reader configuration settings. Exemplary configuration settings may be selection of scanning distance, trigger functionality, pre-defined bar code output data based on the scan input, continuous scanning mode, discontinuous scanning mode or routine, decoding mode or routine, I/O configurations, symbology enablement, output interface functionality, min/max symbology character lengths, scan engine selection, illumination functionality, settings that affect the functional operation of the processor(s), which codes are enabled for processing, aimer operation, engine orientation, illumination, photosensor functionality, software control, sales tracking or warranty tracking, reader capabilities, etc.

Readers and a host system may be equipped with the ability to automatically query and communicate data, such as configuration settings or firmware amongst each other. Upgrading firmware from host to reader and duplicating configuration settings may be performed without human intervention to ensure readers are operating at the same revision and have the same configuration settings reduces user frustration, down time, data integrity and increase efficiencies.

At predetermined time intervals a host system may broadcast various information, such as firmware revision, configuration settings, etc. The host may then download the newer files and update readers during a time of inactivity. Readers may use on board memory or firmware flash memory to store certain configuration settings.

Readers may be configured via serial connection using serial commands. A graphic user interface (GUI) interface may be utilized for creating or reading serial commands, such as Visual Menu or similar such product. This may be done locally or remotely by connecting the optical reader either directly or through a network (such as the internet) to a remote computer and having the remote computer provide software upgrades.

Software upgrades may be necessary for migration from one reader to new or other readers, possibly different manufacturers. Upgrading may be simplified if the configuration of the reader being replaced may be matched or matches the configuration of the equipment that it may be replacing.

If reader software may be replaced, the reader may have the ability to automatically read out configuration settings information in memory and allow the software to adapt and use different methods of control, or different methods of decoding, etc.

An exemplary embodiment for upgrading may be to provide a PC based software tool to read out the non-default configuration settings from a target reader device (the one being replaced) through a serial communication and then to flash the same or equivalent settings into the replacement equipment. This may be considered a direct configuration mapping method, that is, reading the configuration settings on a (old) Device A and flashing them into a (new) Device B.

Another exemplary embodiment may be to provide a PC based software tool that analyzes output scanned data of a known information bearing indicia from a target reader (the one being replaced) and compares it with the output scanned data from the replacement reader. The software tool may interpret how the existing device may be configured based on the difference between the two sets of scanned data. After interpolation of the configuration settings of the replacement reader, the software tool would configure the replacement reader to match the old or replacement reader. This may be considered indirect mapping, wherein the software tool interpolates the inner settings of an existing device from its operation, rather than by direct read out from memory or firmware.

Either exemplary embodiment may be integrated with a cross-browser, client-side DHTML menu builder such as Visual Menu. The configuration of a reader may be read out once and then propagated many times using wireless or over-the-net configuration utilities, hard copy or video display menuing or other suitable means.

A user may update or replace one or more stored configuration settings or configuration setting data utilizing a remote updating system which may be done by connecting the reader either directly or through a network (such as the internet) to a remote processor. With appropriate software, the remote processor may be programmed to read certain configuration settings from the reader, such as software configuration. The remote processor may read the configuration setting data and utilize that data when downloading updates or new software. An operator may request from the remote processor for a software update. The request would be received by either computer, which could read the current software configuration resident on the optical reader and determine the appropriate update or replacement software. Certain bar code symbology types have special data codewords or characteristics which identify them as to be used for configuration. Bar codes which are created utilizing these codewords or characteristics are commonly referred to as configuration bar codes, menuing bar codes, or menuing information bearing indicia (IBI). Typically, a scanning device will come with a manual which has configuration bar codes inside which are used to specifically configure that device. The data contained in the configuration bar code may be used to identify which setting to address, and what value to load for that setting. In some cases if the setting has a range of acceptable values which may be very large, several configuration bar codes, one which addresses the setting and one or more others which define the value, are scanned in succession to configure the setting.

As described herein, POT scanners may incorporate LCD displays that produce several benefits to an operator, including the ability to control the device and communicate with other devices and systems.

Text messaging or texting refers to the exchange of brief written messages between fixed-line mobile device or mobile device and fixed or portable devices over a network. The term refers to messages sent using the Short Message Service (SMS) and messages containing image, video, and sound content (known as Multimedia Message Services or MMS messages). Multimedia Message Services is different from SMS (Short Message Service) because it include photos, video etc. The sender of a text message is known as a texter, while the service itself has different colloquialisms depending on the region, it may simply be referred to as a text in North America, India, Australia, the Philippines and the United Kingdom, an SMS in most of Europe, and a TMS or SMS in the Middle East and Asia.

Text messages may be used to interact with automated systems, such as ordering products and services for mobile devices, or participating in contests. Advertisers and service providers use texts to notify mobile device users about promotions, payment due dates and other notifications.

Text Messaging by mobile devices or mobile devices may include all 26 letters of the alphabet and 10 numerals, i.e. alpha-numeric messages or text to be sent by texter or received by the textee.

MMS may be a store-and-forward method of transmitting graphics, video clips, sound files and short text messages over wireless networks using the WAP protocol. Carriers deploy special servers, dubbed MMS Centers (MMSCs) to implement the offerings on their systems. MMS also supports e-mail addressing providing that a device may send e-mails directly to an e-mail address. MMS may be used for communication between scanners and scanning mobile devices such as POT scanners, mobile devices, PDTs, PDAs, etc.

MMS message refers to a multimedia message, which contains text, audio, video various other multimedia content sent via mobile devices in a mobile device network.

MMS message extends the capacity of SMS sending, which may be limited only to text messages up to 160 or 70 characters in length. Because of their extended content, MMS messages are sent differently from SMS messages. The sending device first encodes the message, then it forwards to a MMS Center (MMSC). The MMSC informs a recipient device of the message. The recipient device downloads the content from the MMSC and displays the content. Some mobile devices are unable to display MMS content, because their screens may only show texts. If the recipient device may be incapable of showing the message, the MMSC sends a text message including the URL (the address of web pages) where the MMS message may be opened and viewed.

A MMS message may be compatible to be sent from different media. Besides GSM mobile devices, MMS services enable specialized MMS Gateways to transfer MMS. Enterprises use automated MMS sending by installing an MMS Gateway software into their systems. Such software may be suitable for sending both SMS and MMS contents.

MMS Gateways set up a GPRS link and download the MMS messages from the MMSC. As the download occurs a unique message ID may be assigned to the message. It may be important to know that incoming MMS messages are made up from individual files, such as JPG and GIF pictures, WAV files and TXT content. They are the attachments of the messages with ID and saved to the same download directory as the messages. Entering the inbox the message ID with the attachment list are displayed and may be found in the download directory.

MMS messages may also be received by subscribing for MMS services. The subscriber sends a code to a preset mobile device number and receives the MMS with the content. MMS messages may contain ringtones, wallpapers, pictures, photos, videos or music. After saving them to the GSM device, the usage of the MMS content becomes possible. Visuals may be set as background pictures and files that with videos and music may be used as ringtones.

MMS messages may offer unlimited ways of communication, self-expression and information mediation. MMS messages are useful tools for commerce and business as they demonstrate the content more explicitly and leaves no gaps in content. Visuals and audios help to underline the meaning of a simple text message, which would otherwise arouse no interest.

Wireless Application Protocol (WAP) may be an open international standard. A WAP browser may be a commonly used web browser for small mobile devices.

MMS, however, may be not the same as e-mail. MMS is based on the concept of multimedia messaging. The presentation of the message may be coded into the presentation file so that the images, sounds and text are displayed in a predetermined order as one singular message. MMS does not support attachments as e-mail does.

MMS text messaging may be utilized on a scanning device such as a barcode scanner at a POT.

MMS is a descendant of SMS (Short Messaging Service). MMS extends text messaging to include longer text, graphics, photos, audio clips, video clips, or any combination.

Short Message Service (SMS) is the text communication service component of mobile device, web or mobile communication systems, using standardized communications protocols that allow the exchange of short text messages between fixed line or mobile device devices, usually between cell mobile devices, or from a PC or handheld to a cell mobile device. The term SMS is used as a synonym for all types of short text messaging as well as the user activity itself in many parts of the world. The "short" part refers to the maximum size of the text messages, such as 160 characters (letters, numbers or symbols in the Latin alphabet).

Mobile devices are constantly sending and receiving information, talking to a cell mobile device tower over a pathway called a control channel. The reason being so that the cell mobile device system knows which cell a mobile device is in so that a mobile device may change cells as it is moved around. Every so often, the mobile device and a cell tower will exchange a packet of data that confirms operable communication conditions.

The mobile device also uses a control channel for call setup. When someone tries to call a mobile device, the cell tower sends the mobile device a message over the control channel that tells the mobile device to play its ringtone. The tower also gives the mobile device a pair of voice channel frequencies to use for the call.

The control channel also provides the pathway for SMS messages. When a SMS message is sent, the message flows through the SMSC, then to the tower, and the tower sends the message to the mobile device as a little packet of data on the control channel. In the same way, the mobile device sends it to the tower on the control channel and it goes from the tower to the SMSC and from there to its destination.

MMS may be used to send photos and videos from camera mobile devices to other MMS mobile devices or email accounts MMS platforms may support SMIL, which allows various parts of an MMS message to be arranged into a small multimedia "slideshow" to be viewed on another SMIL-capable MMS mobile device.

MMS messages are delivered in a different way from SMS messages. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC. If the receiver is on another carrier, the relay forwards the message to the recipient's carrier using the Internet.

Once the MMSC has received a message, it first determines whether the receiver's handset is "MMS capable", that is it supports the standards for receiving MMS. If so, the content is extracted and sent to a temporary storage server with an HTTP front-end. An SMS "control message" containing the URL of the content is then sent to the recipient's handset to trigger the receiver's WAP browser to open and receive the content from the embedded URL. Several other messages are exchanged to indicate status of the delivery attempt. Before delivering content, some MMSCs also include a conversion service that will attempt to modify the multimedia content into a format suitable for the receiver. This is known as "content adaptation".

If the receiver's handset is not MMS capable, the message is usually delivered to a web based service from where the content may be viewed from a normal internet browser. The URL for the content is usually sent to the receiver's mobile device in a normal text message. This behavior is usually known as the "legacy experience" since content may still be received by a mobile device number, even if the mobile device itself does not support MMS.

The method for determining whether a handset is MMS capable is not specified by the standards. A database is usually maintained by the operator, and in it each mobile device number is marked as being associated with a legacy handset or not. It may be a bit hit and miss since customers may change their handset at will and this database is not usually updated dynamically.

E-mail and web-based gateways to the MMS (and SMS) system may be established. On the reception side, the content servers may typically receive service requests both from WAP and normal HTTP browsers, so delivery via the web is simple. For sending from external sources to handsets, most carriers allow MIME encoded message to be sent to the receiver's mobile device number with a special domain. An example of this would be PTN@messaging.carrier.com, where PTN is the public telemobile or mobile device number. Typically the special domain name is carrier specific.

With MMS, handset configuration may cause problems sending and receiving MMS messages. Also, content multimedia content created by one brand of MMS mobile device may not be entirely compatible with the capabilities of the recipient's MMS mobile device. In the MMS architecture, the recipient MMSC is responsible for providing content adaptation (e.g., image resizing, audio codec transcoding, etc.), if this feature is enabled by the mobile network operator. When content adaptation is supported by a network operator, its MMS subscribers enjoy compatibility with a larger network of MMS users than would otherwise be available.

MMS requires a number of handset parameters to be set. Poor handset configuration is often blamed as the first point of failure for many users. Service settings are sometimes pre-configured on the handset, but mobile operators are now looking at new device management technologies as a means of delivering the necessary settings for data services (MMS, WAP, etc.) via over-the-air programming (OTA).

Few mobile network operators offer direct connectivity to their MMSCs for content providers. This has resulted in many content providers using WAP push as the only method available to deliver 'rich content' to mobile handsets. WAP push enables 'rich content' to be delivered to a handset by specifying the URL (via binary SMS) of a pre-compiled MMS, hosted on a content provider's web server. Although the standard does not specify a maximum size for a message, 300 kB is the current recommended size used by networks due to some limitations on the WAP gateway side With regard to barcode scanners utilized in establishments with point of transaction (POT) locations, each barcode scanner may have its own unique text or lane number. This lane number may receive full text messages that will be immediately displayed on the unit's display that is only visible to the operator. An audible beep or blinking light may notify the user that a message has been received, which serves as a discrete method to notify a user, such as a cashier, of a price or security alert message. With scanners having MMS, SMS message or text communication capability, an entire store may be in discrete communication from the store managing office to the checkout counters. Exemplary embodiments of utilization of a discrete messaging communication tool may be: identifying a customer in line that writes bad checks; identifying a customer buying excessive amounts of suspect substances such as butane, sedatives, nitrous oxide products, tobacco, etc.; providing reminders such as a "ASK FOR I.D." for cigarettes or alcohol" message, "ASK TO SEE SIGNATURE" message, etc.

In an exemplary embodiment, a person employed by an establishment such as a store may send a retrieved price check scan from his/her own personal cell mobile device or store owned mobile device rather than having to walk up to the POT or store front to provide scanned price information.

In an exemplary embodiment, an establishment recognizes information or data is obtained from an information bearing medium, such as a card having a magnetic strip (mag strip) or symbol indicia (such as one or two dimensional symbologies), an RFID instrument, biometric information such as a fingerprint or retina, etc. The establishment then retrieves identification information, (such as driver's license information, address information, a photo, a picture, etc.) of the bearer (i.e. customer) of the information bearing medium from either an establishment server or a remote server and sends that identification information via a message to the scanner present at the location of the bearer, such as at a POT.

An exemplary flowchart for operating a scanning system in FIG. 3 begins with a customer at POT 510. While the customer is at the POT, the establishment sends a message to a scanner at the POT 514 and signals the scanner operator that a message has been sent 518. The scanner operator reads the message 522 and is either told or decides 526 to continue with the transaction 530 or terminate the transaction 534.

In an exemplary embodiment, an establishment recognizes information or data is obtained from an information bearing medium, such as a card having a magnetic strip (mag strip) or symbol indicia (such as one or two dimensional symbologies), an RFID instrument, biometric information such as a fingerprint or retina, etc. The establishment then retrieves identification information, (such as driver's license information, address information, a photo, a picture, etc.) of the bearer (i.e. customer) of the information bearing medium from either an establishment server or a remote server and sends that identification information via a message to a scanner other than the scanner present at the location of the bearer or in addition to the scanner present at the location of the bearer. The identification information may be sent to multiple scanners in the establishment for security purposes.

What is described herein is a method of operating an indicia reader providing a display on an indicia reader adapted for hand held operation to read information bearing indicia (IBI) at a point of transaction (POT); configuring the indicia reader to accept an establishment specific notice; reading an IBI at a POT with the indicia reader; and, providing at least one MMS, SMS or other text communication to an operator of the indicia reader at the POT on the indicia reader display from the establishment when the establishment recognizes the need for a specific notice requirement according to a predetermined set of rules, an algorithm, observation, or other input recognizing a security risk.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. A method comprising:
 reading an information bearing indicia (IBI) at a point of transaction (POT) at an establishment with an indicia reader; and
 when the establishment recognizes a security risk and a need for a specific notice requirement based on the security risk, sending a text message communication to the indicia reader for display on a graphic user interface (GUI).

2. The method of claim 1, wherein the text message communication is a multimedia message services (MMS) text.

3. The method of claim 1, wherein the text message communication is a short message services (SMS) text.

4. The method of claim 1, wherein the text message communication comprises a picture of a person at the POT.

5. The method of claim 1, comprising:
 retrieving identification information about a person at the POT; and
 sending a picture of the person at the POT to another indicia reader.

6. The method of claim 1, comprising:
 retrieving identification information about a person at the POT; and
 sending address information of the person at the POT to another indicia reader.

7. The method of claim 1, comprising terminating a transaction attempted by a person at the POT.

8. The method of claim 1, comprising audibly signaling an operator of the indicia reader that a text message communication has been sent.

9. An indicia reader system comprising:
 an indicia reader for reading information bearing indicia (IBI) at a point of transaction (POT) at an establishment, the indicia reader comprising a graphic user interface (GUI), wherein the indicia reader is configured for accepting a text message communication from the establishment; and
 the establishment being configured for:
 after the indicia reader reads an IBI at the POT, recognizing a security risk and a need for a specific notice requirement based on the security risk; and
 after recognizing a need for a specific notice requirement based on the security risk, sending a text message communication to an operator of the indicia reader at the POT for display on the GUI.

10. The indicia reader system of claim 9, wherein the text message communication is a multimedia message services (MMS) text.

11. The indicia reader system of claim 9, wherein the text message communication is a short message services (SMS) text.

12. The indicia reader system of claim 9, wherein the text message communication comprises a picture of a person at the POT.

13. The indicia reader system of claim 9, wherein the establishment is configured for:
- retrieving identification information about a person at the POT; and
- sending a picture of the person at the POT to the indicia reader and another indicia reader.

14. The indicia reader system of claim 9, wherein the establishment is configured for:
- retrieving identification information about a person at the POT; and
- sending address information of the person at the POT to the indicia reader and another indicia reader.

15. The indicia reader system of claim 9, wherein the system is configured for terminating a transaction after sending a text message communication.

16. A method comprising:
- reading an information bearing medium at an establishment with an indicia reader; and
- when the establishment recognizes a security risk and a need for a specific notice requirement based on the security risk after reading the information bearing medium, sending a text message communication to the indicia reader.

17. The method of claim 16, comprising sending the text message communication to multiple indicia readers.

18. The method of claim 16, wherein the text message communication instructs the operator to terminate a transaction in progress.

19. The method of claim 16, wherein the text message communication is a short message services (SMS) text.

20. The method of claim 16, wherein the text message communication comprises a picture of a person at the POT.

\* \* \* \* \*